United States Patent [19]
Gubitz

[11] Patent Number: 5,636,831
[45] Date of Patent: Jun. 10, 1997

[54] SHOCK ABSORBER AND PNEUMATIC SPRING ASSEMBLY

[75] Inventor: Holger Gubitz, Schweinfurt, Germany

[73] Assignee: Fichtel & Sachs AG, Schweinfurt, Germany

[21] Appl. No.: 430,558

[22] Filed: Apr. 28, 1995

[30] Foreign Application Priority Data

Apr. 29, 1994 [DE] Germany ............................ 44 15 045.8

[51] Int. Cl.$^6$ .................................. F16F 9/05; F16F 9/08; F16F 13/20
[52] U.S. Cl. ............................ 267/64.24; 267/64.27; 267/35; 267/220; 280/712
[58] Field of Search ......................... 267/64.11, 64.21, 267/64.19, 64.23, 64.24, 64.27, 122, 64.15, 64.16, 64.17, 219, 220, 153, 152, 141, 140.3, 35; 280/711, 712, 710, 709, 716, 693, 672, 692, 697, 671

[56] References Cited

U.S. PATENT DOCUMENTS

| | | | |
|---|---|---|---|
| 3,042,392 | 7/1962 | Schmitz et al. | 267/64.21 X |
| 3,263,983 | 8/1966 | Bliven | 267/220 |
| 3,700,225 | 10/1972 | Fader et al. | 267/64.24 |
| 4,235,426 | 11/1980 | Sullivan, Jr. et al. | 267/35 X |
| 4,398,706 | 8/1983 | Buchanan, Jr. et al. | 267/64.21 |
| 4,502,673 | 3/1985 | Clark . | |
| 4,513,845 | 4/1985 | Stephens et al. . | |
| 4,555,096 | 11/1985 | Pryor | 267/64.21 |
| 4,643,407 | 2/1987 | Zirk | 267/64.24 |
| 4,666,135 | 5/1987 | Buma et al. | 267/64.21 |
| 4,771,994 | 9/1988 | Makita | 267/64.21 |
| 4,771,996 | 9/1988 | Martinez, Jr. et al. | 267/220 |
| 4,961,594 | 10/1990 | Pees | 267/64.24 |
| 4,989,844 | 2/1991 | Wijnhoven et al. | 267/64.24 |
| 5,180,144 | 1/1993 | Hellyer et al. . | |
| 5,263,694 | 11/1993 | Smith et al. | 267/220 |
| 5,301,777 | 4/1994 | Handke | 267/220 |
| 5,308,104 | 5/1994 | Charles | 267/20 |
| 5,346,187 | 9/1994 | Drescher | 267/122 |

FOREIGN PATENT DOCUMENTS

| | | | |
|---|---|---|---|
| 0364411 | 4/1990 | European Pat. Off. . | |
| 61-206835 | 9/1986 | Japan | 267/35 |
| 2062167 | 5/1981 | United Kingdom . | |
| 2200717 | 8/1988 | United Kingdom | 267/35 |

Primary Examiner—Douglas C. Butler
Attorney, Agent, or Firm—Nils H. Ljungman & Associates

[57] ABSTRACT

A shock absorber with a pneumatic spring, has a spring carrier against which a roller tube is braced, which roller tube together with a spring bellows and an outer tube forms a spring chamber. There can also be an end cap braced against that end of the spring carrier facing the outer tube, wherein that the roller tube and the end cap are connected to form a structural unit, whereby the connection permits axial relative movement between the end cap and the roller tube, at least for assembly.

19 Claims, 14 Drawing Sheets

5,636,831

SHOCK ABSORBER AND PNEUMATIC SPRING ASSEMBLY

BACKGROUND OF THE INVENTION

1. Field of the Invention

The invention relates to a shock absorber or vibration damper with a pneumatic spring.

2. Background Information

Such a pneumatic spring is disclosed in the company brochure Order No. 07 3678.920306 of the applicant. With certain types of pneumatic springs, it is sometimes the case that a stop disk, such as a member in the form of an end cap, placed on the end of the spring carrier at which the piston rod exits, has an outside diameter larger than the inside diameter of a roller tube. Assuming that one wishes to preassemble the spring bellows, the roller tube and the outer tube separately from the spring carrier, such as a vibration damper, to form a separate structural unit which is subsequently placed over the spring carrier, there is a problem as how to fasten the rest plate to the spring carrier, since the rest plate can no longer be inserted into and positioned inside the spring bellows.

OBJECT OF THE INVENTION

The object of the current invention is to refine a pneumatic spring in such a manner that the problem described above is solved.

SUMMARY OF THE INVENTION

To achieve this object, the invention teaches that the roller tube and the end cap can preferably be connected to form a structural unit, whereby the connection permits an axial relative movement between the end cap and the roller tube, at least during assembly. As a result of the relative movement, the two components do not have to be realized as a rigid structural unit for assembly purposes, as such a rigid unit would require that an even greater number of roller tubes and/or end caps would have to be fabricated for a number of applications, such as in the automobile sector. Furthermore, there is a substantial material savings compared to a monobody structural unit consisting of roller tube and end cap. A secondary effect is that an overdetermination of the position of the structural unit can be avoided.

According to one embodiment, it is advantageous to realize the connection as a detachable temporary connection which separates after assembly. By this means, two parts can be retained and any number of end cap - roller tube combinations can be realized without a disproportionate increase in the number of parts.

For example, the temporary connection can consist of a press fit. Alternatively, the temporary connection can also be realized as a snap connection. In another variant, the temporary connection has a designed breaking point between the roller tube and the end cap.

As another alternative, the connection can be realized by means of an elastic transfer element. In this case, the roller tube and the end cap form a permanent structural unit, whereby the required displacement path between the roller tube and the end cap is compensated for by means of the transfer element.

A process for the assembly of a pneumatic spring is used in which a roller tube, a spring bellows and an outer tube are assembled separately to form a sub-component, whereby this sub-component is later placed over a spring carrier. During assembly of the sub-component, the roller tube and the end cap are subsequently joined by means of a temporary connection to form a structural unit. The end cap can then be pushed onto the spring carrier, and axial assembly forces can cause the roller tube and the end cap to undergo an axial relative movement until reaching the respective final installed positions. It is advantageous if both components are mounted in a single process step, whereby the end cap is installed via the roller tube.

The transfer forces of the temporary connection are greater than the frictional forces acting on the end cap when mounting the end cap to the spring carrier, This ensures proper seating of the end cap after assembly.

BRIEF DESCRIPTION OF THE DRAWINGS

The invention is described in greater detail below with reference to the attached drawings in which.

DESCRIPTION OF THE PREFERRED EMBODIMENT

Figure 2:
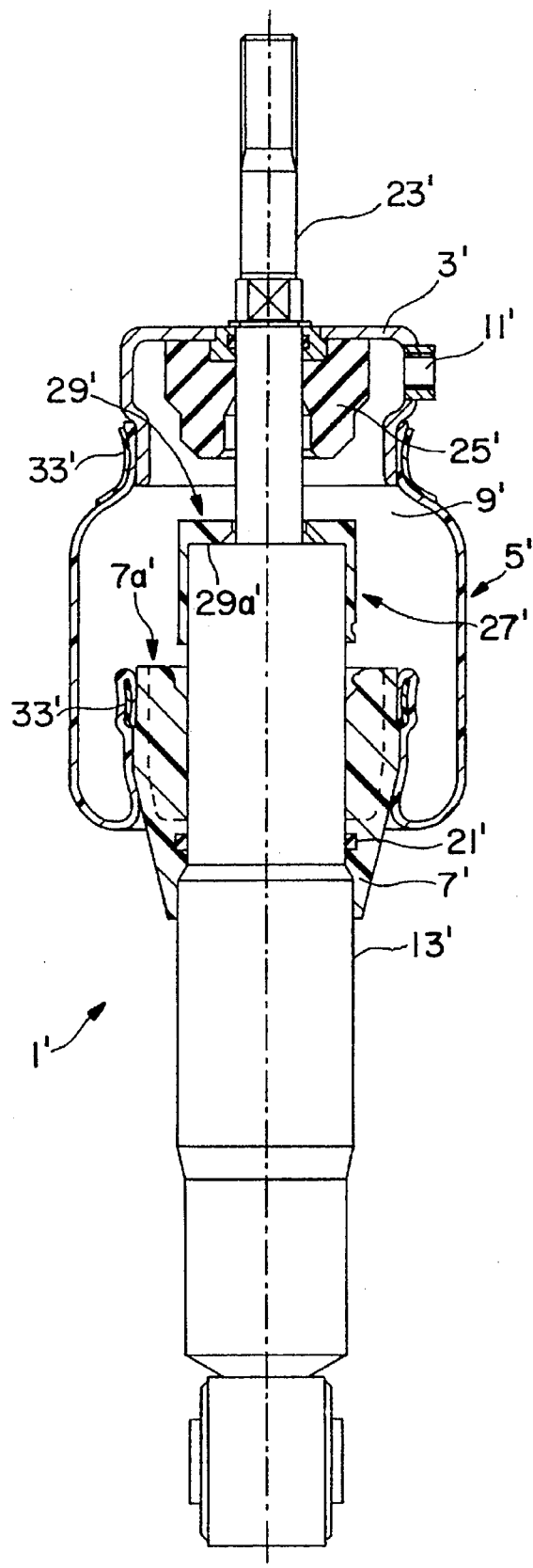
FIGS. 1 and 2 show a pneumatic spring with a snap connection or a press fit between the end cap and the roller tube.
Figure 1:
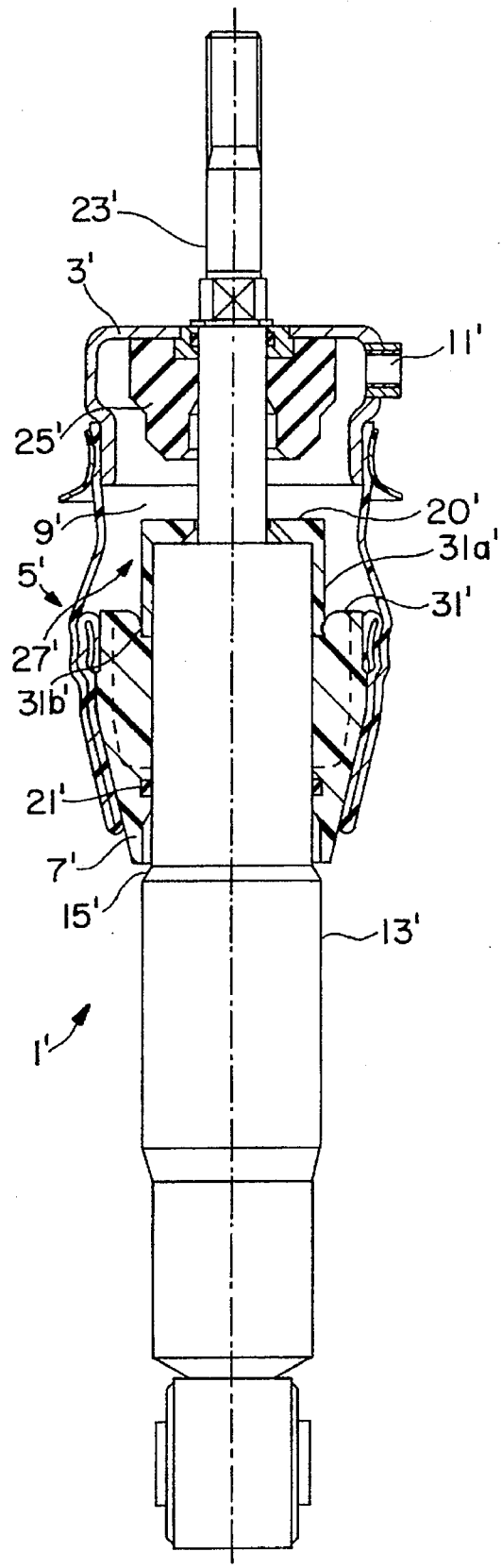

FIGS. 1 and 2 show a pneumatic spring 1', composed of an outer tube 3' which together with a spring bellows 5' and a roller tube 7', forms a spring chamber 9', whereby the spring chamber 9' is typically supplied with compressed air via a connecting branch 11'.

The roller tube 7' can be braced against a spring carrier 13', which in this embodiment is realized as a vibration damper. The spring carrier 13', which may be a receptacle tube or a sheath tube, of the vibration damper has a shoulder 15' against which the roller tube 7' is braced. At least one gasket 21' can be provided to seal the spring chamber 9' against the atmosphere at the receptacle tube. The outer tube 3' can be connected to a piston rod 23', which piston rod 23' can be connected to a secondary spring 25' in the form of an elastic buffer. With a larger stroke of the piston rod 23', the buffer can be braced against, or strike against, in the direction of entry, an end cap 27', whose top surface 20' represents a stop face 29'. In FIG. 1, the roller tube 7' and the end cap 27' form a temporary structural unit by means of a detachable connection 31' which permits an axial relative movement between the components 7', 27' during assembly. The connection 31' is realized as a press fit 31b' on the left side and as a snap connection 31a' on the right.

For assembly, the end cap 27' can be inserted into the roller tube 7' until the connection 31' is established. This can then be followed by assembly with the spring bellows 5' and the outer tube 3', as well as the buffer 25', separate from the assembly of the spring carrier 13'. Clamping elements such as taut tape elements 33' (illustrated in FIG. 2) can be used to connect the spring bellows 5' with the outer tube 3' and the roller tube 7'. The pneumatic spring can subsequently be placed over the piston rod 23', whereby the roller tube 7' slides axially over the receptacle tube 13' until the end cap 27' comes in contact with that end of the receptacle tube 13' from which the piston rod exits. During the initial assembly, it can essentialy be sufficient if the end cap 27' "nuzzles up against" the receptacle tube 13'. Air pressure later applied to the spring chamber 9' can then be utilized to displace the end cap 27' until the back of the stop surface 29' or the bottom surface 29a' (shown in FIG. 2) comes in contact with the receptacle tube 13'. Up until this assembly step, the roller tube 7' and the end cap 27' would essentially form a structural unit, since the holding force of the connection between the components 7', 27' is greater than the frictional force between the end cap 27' and the receptacle tube 13'.

As shown in FIG. 2, the roller tube 7' is preferably subsequently moved axially in the direction of the support shoulder 15' or support ring 17' (shown in FIG. 6). This can be done by supplying the spring chamber 9' with compressed air via the connecting branch 11' so that the pressure acting on the radial surfaces 7a' facing the spring chamber 9' breaks the connection 31' between the roller tube 7' and the end cap 27' and effects an axial movement to the shoulder 15'. This process can alternatively be performed by applying a tool to the outside diameter of the roller tube 7' and tugging.

Figure 3:
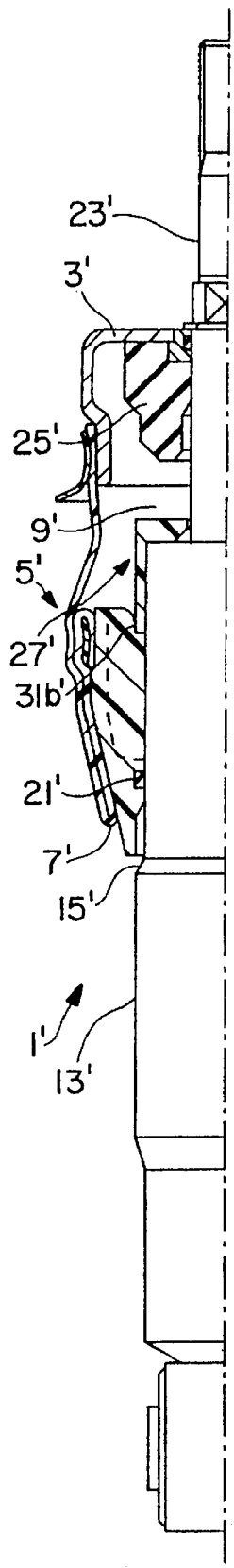
FIG. 3 shows a pneumatic spring with a snap connection between the end cap and the roller tube.

FIG. 3 is a further illustration of an embodiment illustrated in FIG. 1. The connection 31' in this embodiment is realized as a press fit 31b'.

Figure 4:
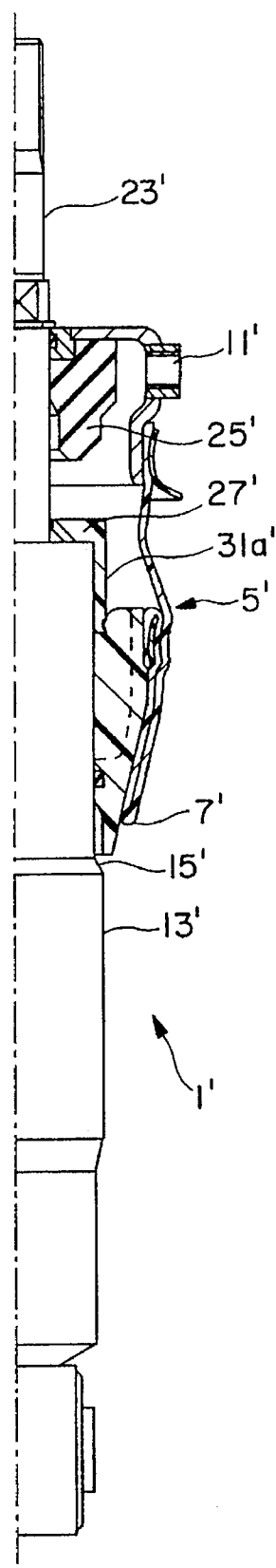
FIG. 4 shows a pneumatic spring with a press fit between the end cap and the roller tube.

FIG. 4 is a further illustration of an embodiment illustrated in FIG 1. In this embodiment, the connection 31' is realized as a snap fit 31a'.

Figure 5:
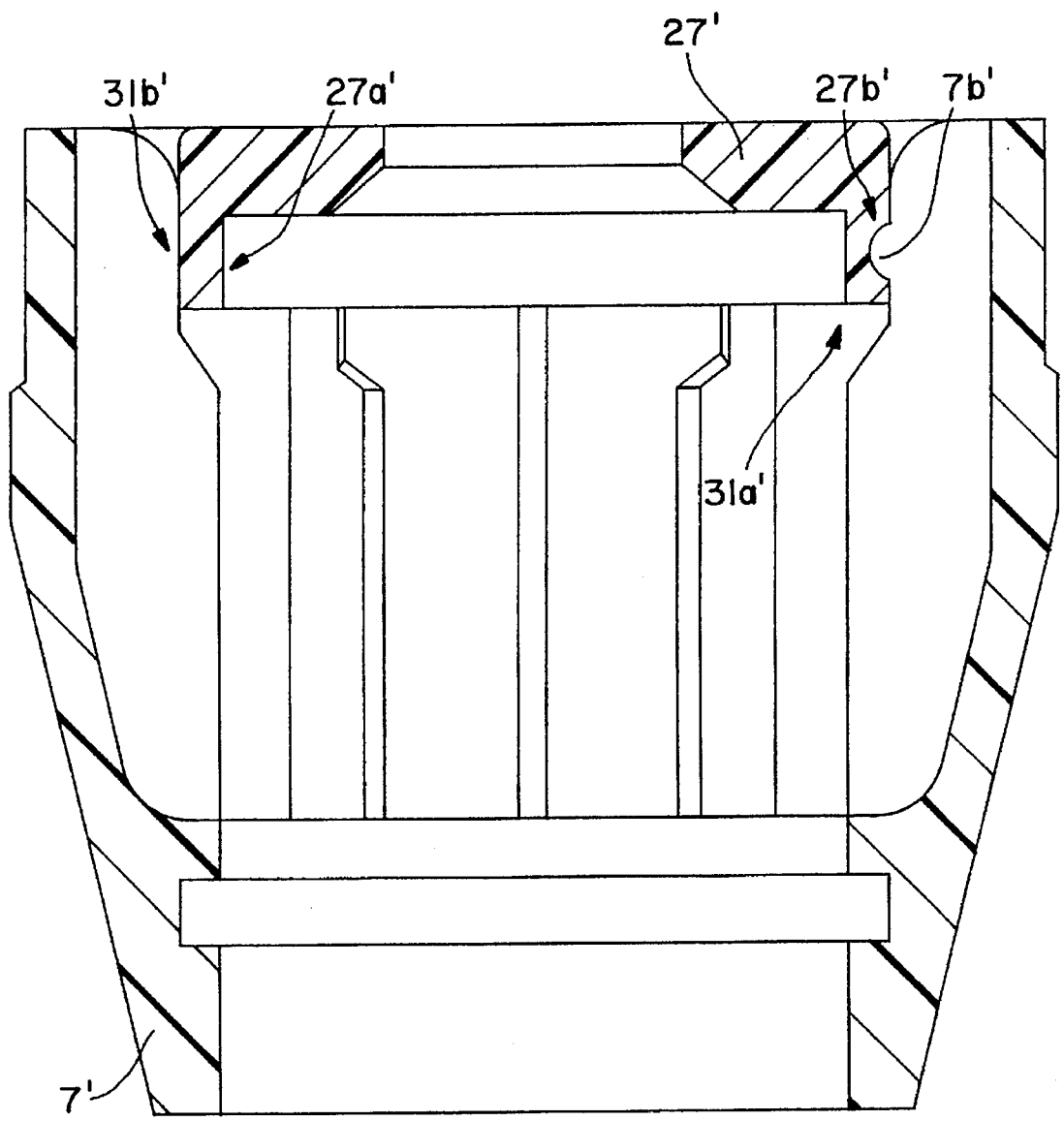
FIG. 5 shows the structural unit consisting of the end cap and the roller tube shown in FIGS. 1 and 2 as a single part.

FIG. 5 is an enlarged representation of the structural unit wherein the roller tube 7' and the end cap 27' are preferably formed as a single part. Assembly with the other components of the pneumatic spring 1' occurs in this position. In the left-hand portion of FIG. 5, the connection 31' between the roller tube 7' and the end cap 27' is realized as a press fit 31b', whereby the fit between the outside diameter of the sleeve portion 27a' of the end cap 27' and the inside diameter of the roller tube 7' is formed.

On the right portion in FIG. 5, the connection 31' is realized as snap connection 31a', whereby catch knobs 7b' or an encircling bead interact with a groove 27b'.

Figure 7:
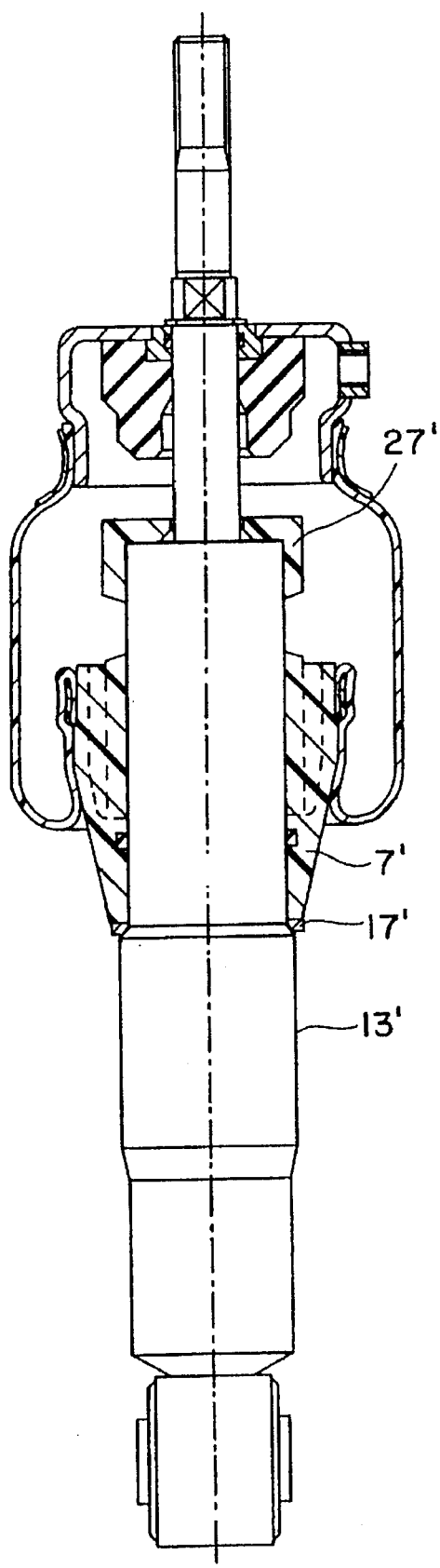
FIGS. 6 and 7 show a pneumatic spring with an engineered breaking point between the end cap and the roller tube.
Figure 6:
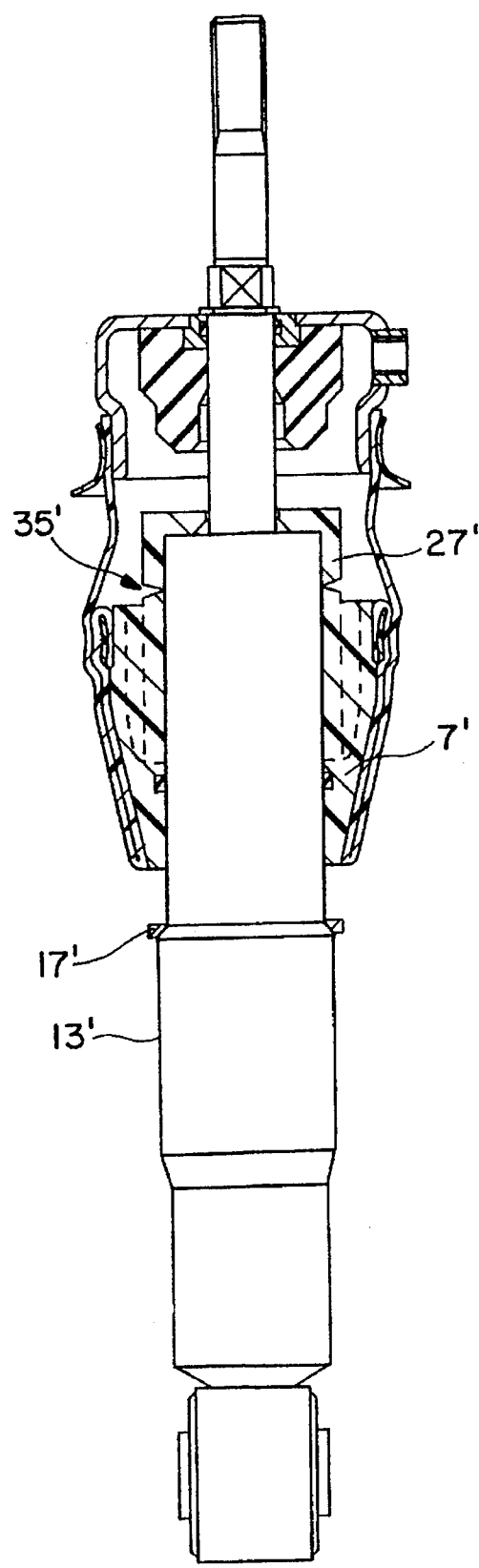

FIGS. 6 and 7 are essentially identical to FIGS. 1 and 2 except for the configuration of the connection between the end cap 27' and the roller tube 7'. The fundamental difference lies in the fact that the connection between the end cap 27' and the roller tube 7' includes an engineered breaking point 35'. This engineered breaking point 35' comes into play during the assembly step in which the end cap 27' comes to rest against the receptacle tube 13'. During assembly, the roller tube 7' is separated from the end cap 27' and can be displaced towards the support ring 17', whereby the parting forces can preferably be substantially the same as the transfer forces in the description of FIGS. 1 and 2.

Figure 8:
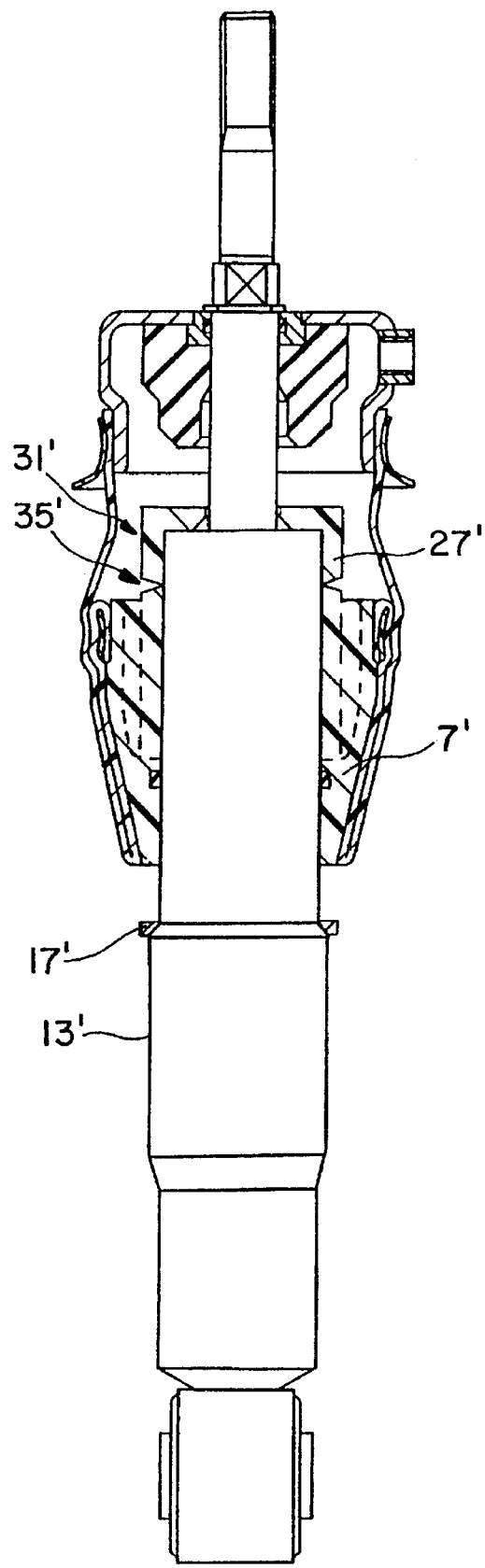
FIG. 8 shows a pneumatic spring with an engineered breaking point between the end cap and the roller tube.

FIG. 8 is a further depiction of FIG. 6. FIG. 8 further illustrates the connection 31'.

Figure 9:
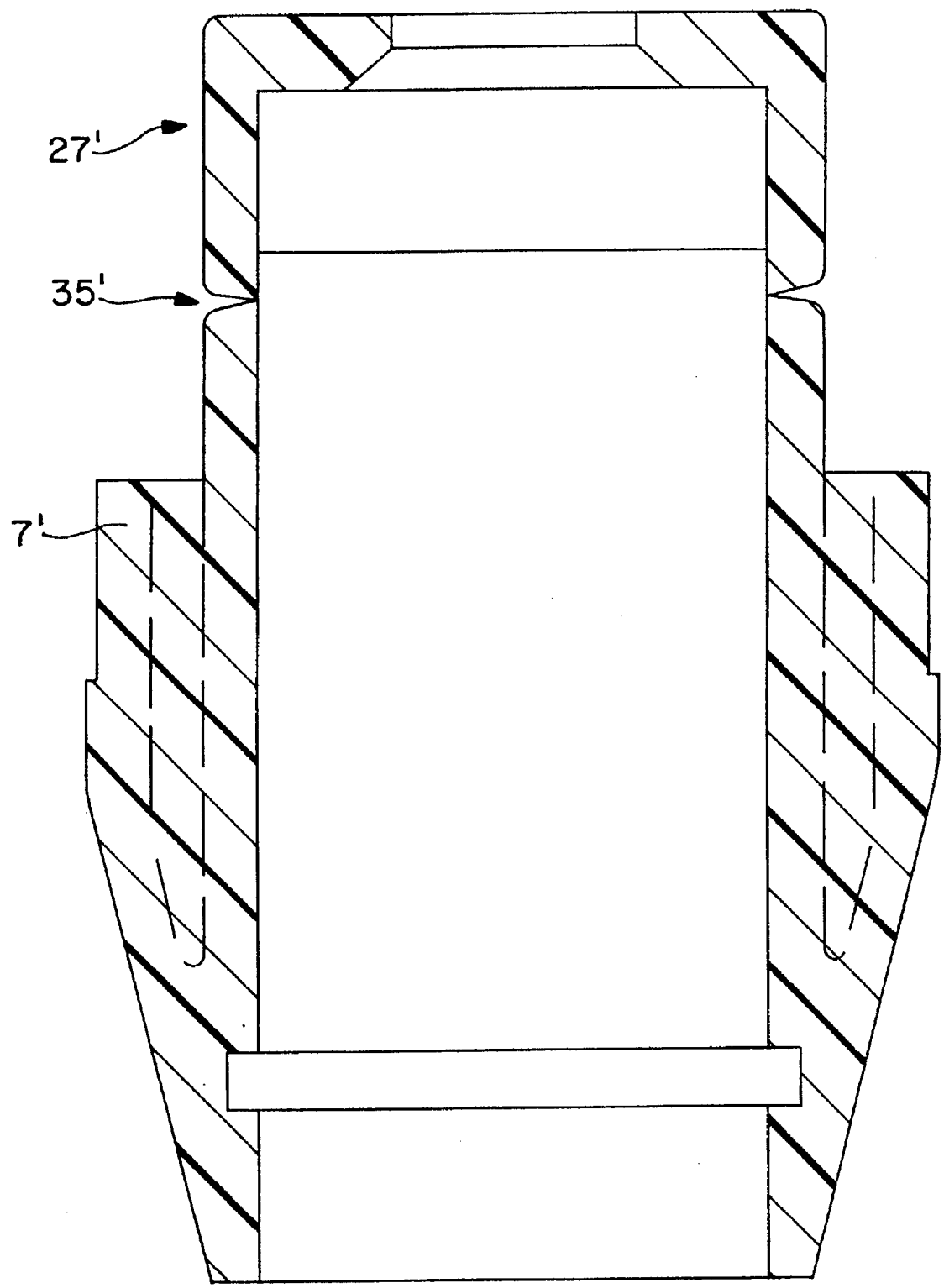
FIG. 9 shows the structural unit consisting of the end cap and the roller tube shown in FIGS. 6 and 7 as a single part.

FIG. 9 is an enlarged representation of the structural unit forming the end cap 27' and the roller tube 7'. Here the structural unit has a neck with a reduced wall thickness as the engineered breaking point 35'. The wall thickness is preferably chosen such that the assembly forces necessary to move the end cap 27' into its specified position can be transferred. Instead of a reduction in wall thickness, the engineered breaking point 35' can be realized in other ways, such as a perforation.

Figure 10:
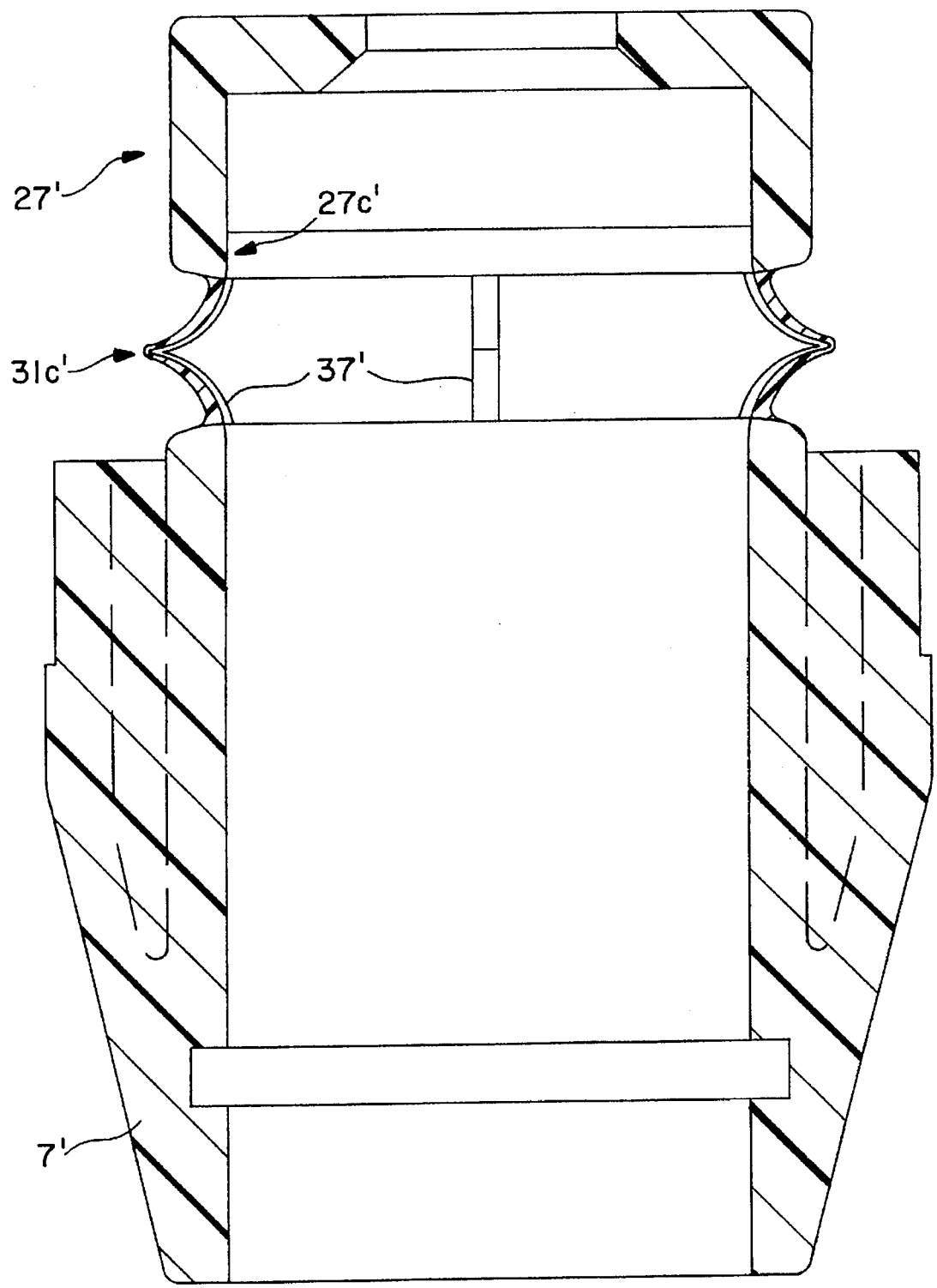
FIG. 10 shows the structural unit consisting of the end cap and the roller tube having an elastic transfer element.

As shown in FIG. 10, another option is the use, between the roller tube 7' and the end cap 27', of a structural unit having an elastic transfer element 31c'. In this embodiment, elastic tape elements 37' form the transfer element 31c' and permit an axial relative movement between the roller tube 7' and the end cap 27'. However, the transfer element 31c' is preferably of sufficient stiffness that the end cap 27' and the roller tube 7' lie, to the greatest extent possible, along a common longitudinal axis so as not to hinder the threading of the end cap 27'. In this case, a threading projection 27c' is fastened to the end cap 27' in the vicinity of the transfer element 31c'. If the extended length of the transfer element 31c' is not sufficient to place the roller tube 7' against the supporting ring 17', the transfer element 31c' can be destroyed during assembly by the application of a sufficient force so that the effect of an engineered breaking point 35' is achieved. Of course, the transfer element 31c' can also look differently, like an expansion bellows, for example, In one embodiment of the present invention, the transfer element 31c' can stretch and remain intact instead of breaking. During assembly, the connection 31' between the roller tube body 7' and the end cap 27' body may be broken, however the transfer element 31c' may stretch, and still remain intact. The transfer element 31c' is preferably made of a material that will remain stiff when not stretched, but also allow the transfer element 31c' to stretch when necessary.

Figure 11:
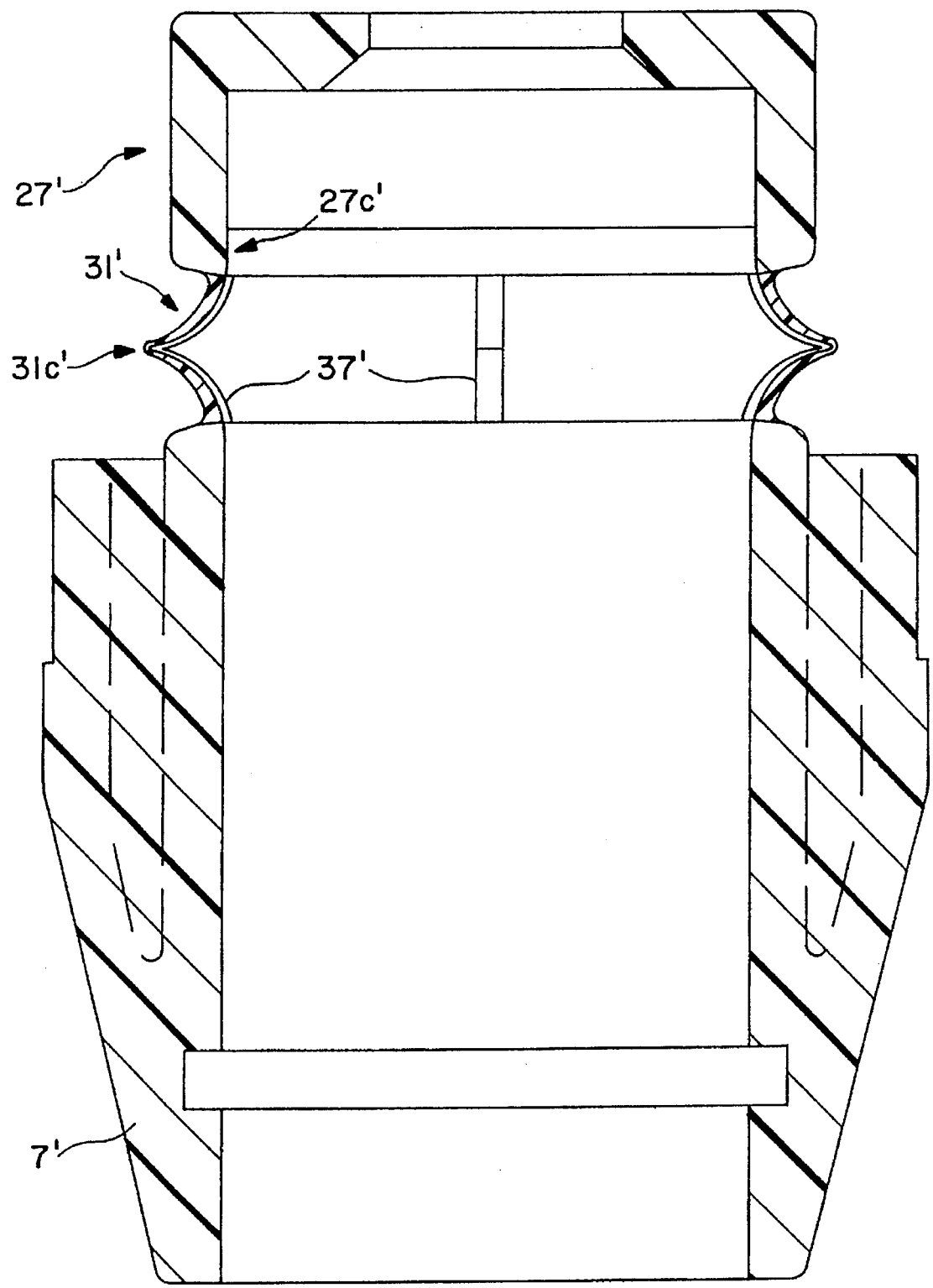
FIG. 11 shows the structural unit consisting of the end cap and the roller tube having an elastic transfer element.

FIG. 11 is a further illustration of an embodiment shown in FIG. 10. FIG. 11 further illustrates the connection 31'.

In some embodiments of the present invention (not illustrated), various means of temporarily connecting the end cap 27' and roller tube 7' are possible. In one embodiment a protrusion or projection is possible. The projection can either extend from the end cap 27' or the roller tube 7', or both. The projection can be a ring or groove or one or a series of spikes. In yet other embodiments of the present invention, an end cap that is pressed into place and sticks with an adhesive is possible.

Figure 12:
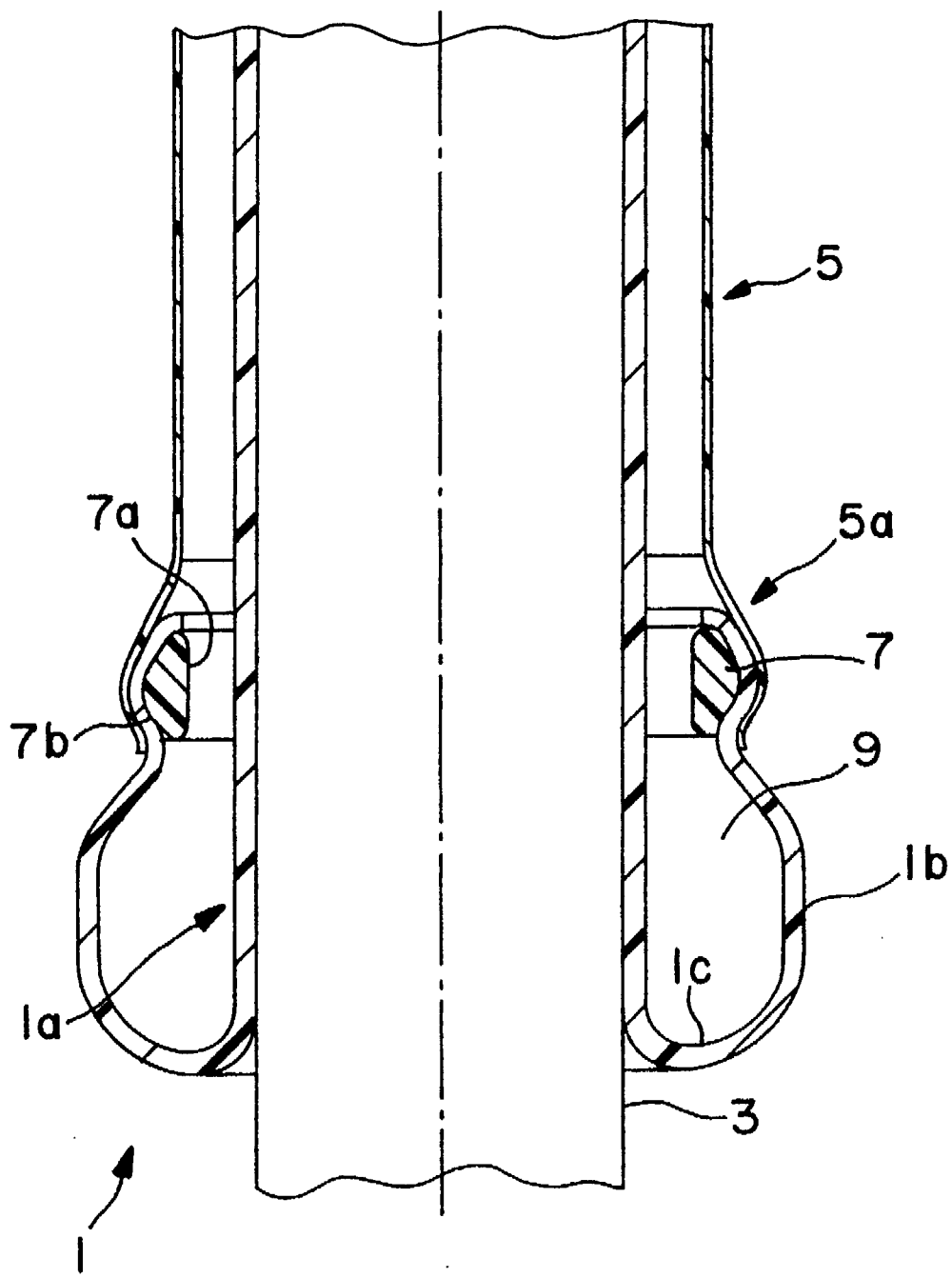
FIG. 12 shows a partial view of a pneumatic spring in cross section.

FIG. 12 additionally shows essential parts of a pneumatic spring. The pneumatic spring can generally include a rolling bellows 1 having a first part 1a and a second part 1b. The first part 1a of the rolling bellows 1 can preferably be fastened to a tubular body 3. In accordance with one preferred embodiment of the present invention, tubular body 3 can be considered to represent an outer tube or cylinder of a shock absorber, such as that shown in FIG. 15 discussed further below. The second part 1b of the rolling bellows 1 can be fastened, by means of a retaining ring 7, to a fastening segment 5a of an external tube 5. The external tube 5 can preferably be disposed about tubular body 3. The rolling bellows 1 and the external tube 5 preferably form an air-filled spring chamber 9. The rolling bellows 1 can preferably have a bead 1c wherein the rolling bellows 1 can be turned back over on itself such that part 1b is disposed substantially about part 1a.

If the pneumatic spring is in an inclined position, or in the event of the loss of compressed air in the spring chamber 9, the retaining ring 7 can act as a guide with respect to the part 1a of the rolling bellows 1. The inclined position of the pneumatic spring, which can hardly be prevented, and is even desirable under some circumstances to compensate for transverse forces, essentially no longer represents a wear situation for the pneumatic spring, and more specifically for part 1a of the rolling bellows 1.

The material of which the retaining ring 7 is made can preferably be selected so that at least the inner surface 7a of the retaining ring 7 is provided with a coating, which coating can preferably be an anti-friction coating. Essentially, a simple retaining ring 7 made preferably entirely of plastic can provide the necessary anti-friction properties, thereby requiring no additional coating on the retaining ring 7.

To prevent major deformations of the external tube 5 in the vicinity of the fastening segment 5a, the retaining ring 7 can preferably have an essentially concave shell surface 7b. The shell surface 7b can act as a clamping surface of the roller bellows 1 with respect to the external tube 5.

Figure 15:
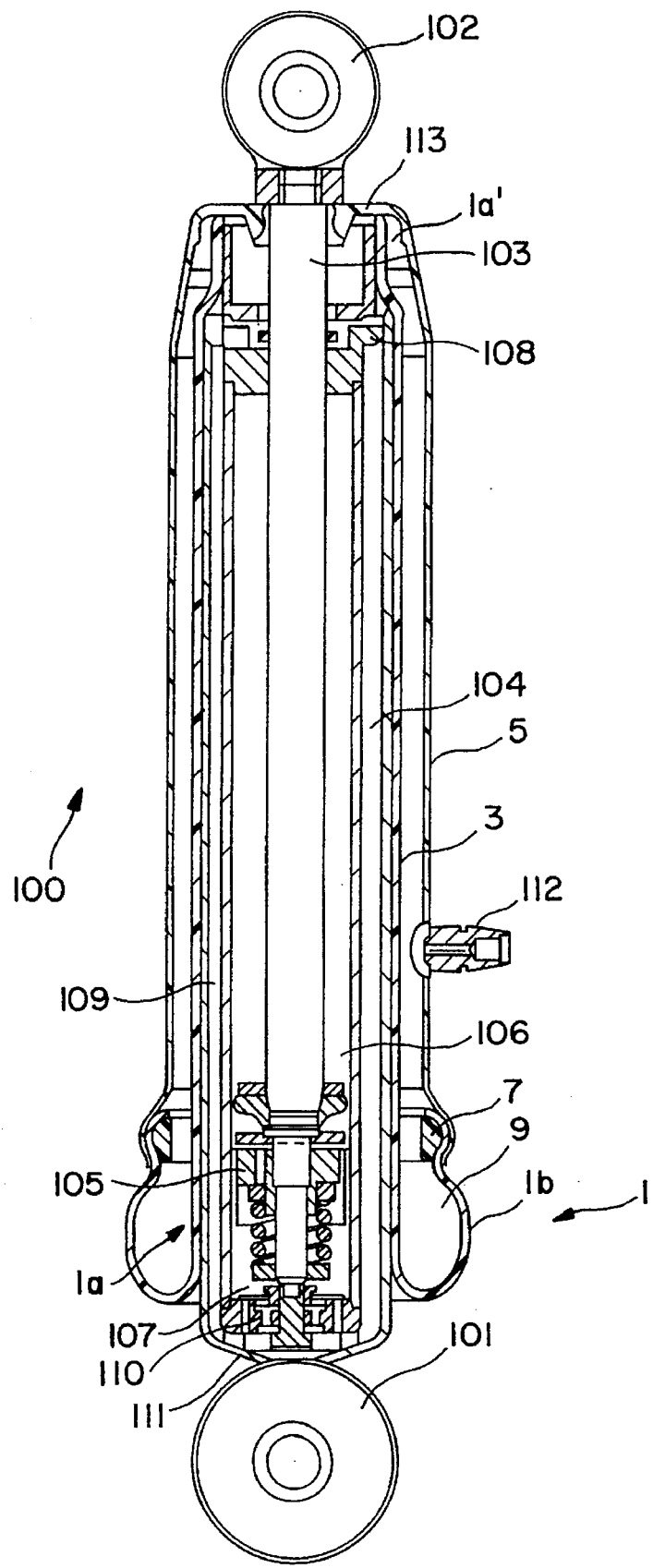
FIG. 15 shows one example of a shock absorber incorporating the pneumatic spring.

In accordance with one possible method of assembly of the pneumatic spring of the present invention, the rolling bellows 1 can preferably be placed about tubular body 3, part 1a of the rolling bellows 1 being in contact with the outside of tubular body 3 and fastened thereto by a clamping arrangement 1a' shown in FIG. 15. The retaining ring 7 can then preferably be placed about the rolling bellows 1 and tubular body 3. Part 1b of the rolling bellows 1 can then be folded backwards over part 1a towards retaining ring 7 and ends 1d (see FIG. 13) of part 1b can preferably be pulled up and over the shell surface 7b of retaining ring 7. External tube 5 can then be placed around the rolling bellows 1 and tubular body 3. In accordance with one embodiment, the fastening segment 5a of the external tube 5, before assembly, can preferably be in the form of an angled edge, the segment 5a being angled with respect to an upper portion 5b (see FIG. 13) of external tube 5. Thus, the fastening segment 5a can preferably extend at an angle from upper portion 5b and can extend radially outwardly towards the pneumatic spring. The fastening edge 5a and external tube 5 can then be moved downward, or towards the rolling bellows 1, and can then be bent or deformed around the ends 1d of part 1b in order to clamp part 1b into place about the retaining ring 7.

Figure 13:
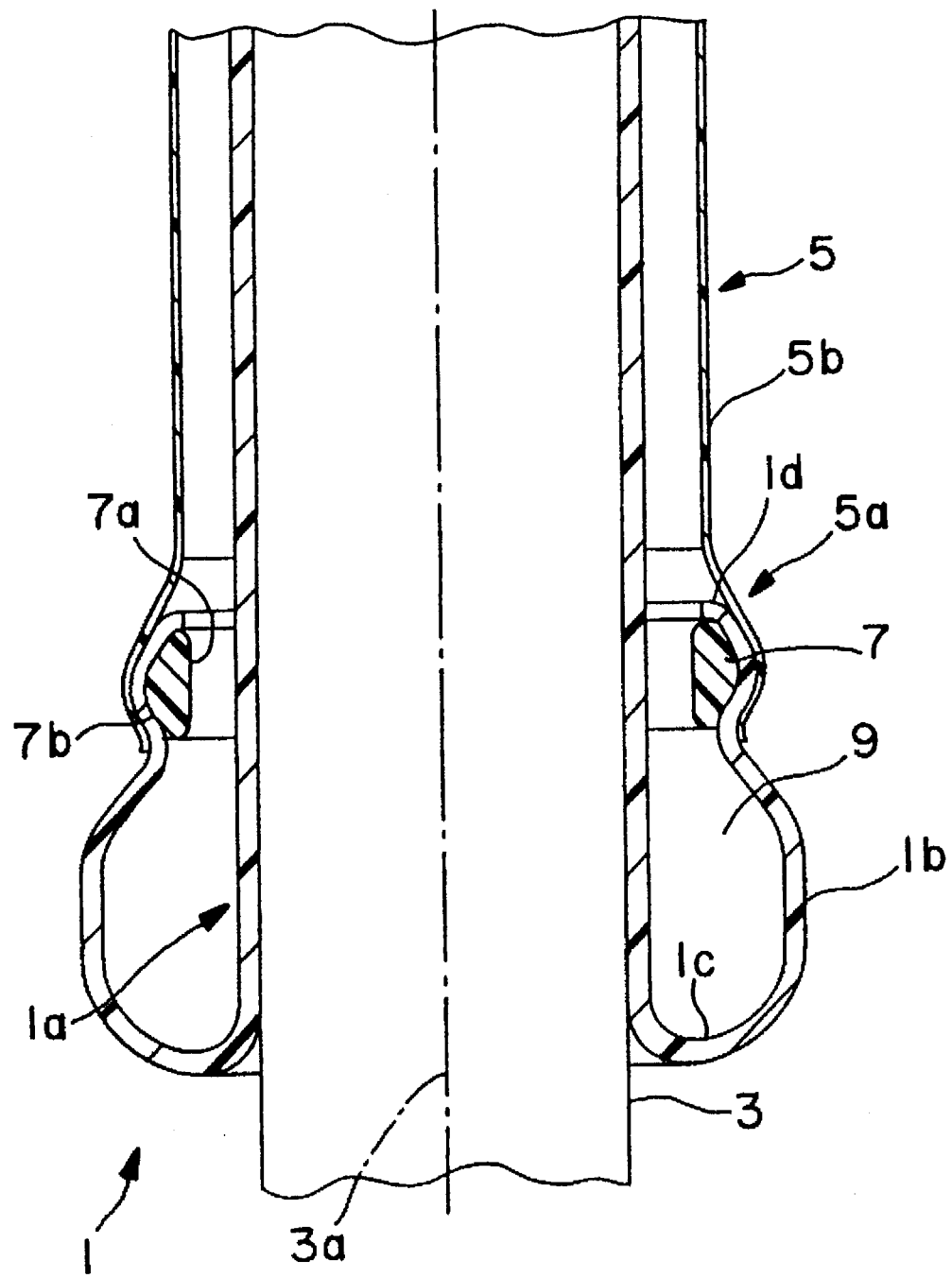
FIG. 13 shows substantially the same view as FIG. 12, but shows additional details.

Alternatively, the fastening edge 5a could conceivably be pre-formed with the curved shape shown in FIGS. 12 and 13, and the rolling bellows 1 can then be inserted into the external tube 5 within fastening edge 5a. Once the end 1d of the rolling bellows 1 is disposed within edge 5a, the retaining ring 7 can then be pushed into the external tube 5 in order to hold the rolling bellows 1 in place. Thus, the retaining ring 7 can "snap" into place within fastening edge 5a.

Figure 14:
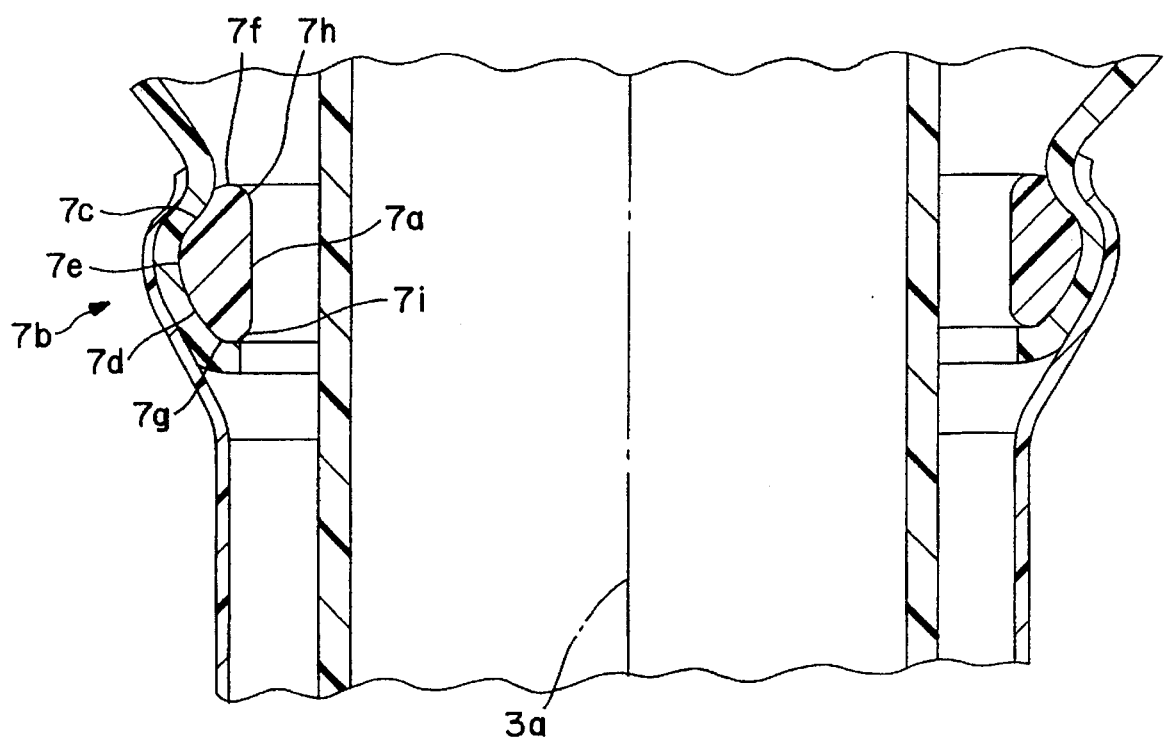
FIG. 14 shows an enlarged view of the retaining ring of the pneumatic spring.

The disclosure now turns to a more detailed description of the components of the retaining ring 7 of the present invention. FIGS. 12 and 13 may generally be considered to be scale representations of the pneumatic spring of the present invention. Possible dimensions of the retaining ring 7 will be discussed herebelow with reference to FIG. 14. It should be noted that FIG. 14 is an enlarged view of retaining ring 7 and the surrounding structures, the view shown in FIG. 14 being about twice the size of the views shown in FIGS. 12 and 13. Thus, any dimensions of the retaining ring 7 given herebelow with reference to FIG. 14 have been appropriately divided in half in order to apply to the scale representations shown in FIGS. 12 and 13.

The longitudinal axis 3a (see FIGS. 13 and 14) of tubular body 3 will be used as a reference axis and anything hereinafter referred to as "longitudinal", absent any other explanation, should be taken to be indicative of being parallel to the longitudinal axis 3a. Accordingly, anything hereinafter referred to as "transverse", absent any other explanation, should be taken as indicative of being transverse to the longitudinal axis 3a.

In a preferred embodiment of the present invention, the external contour of retaining ring 7 can generally be described as substantially convex. There can, however, preferably be two slightly concave areas 7c and 7d located on shell surface 7b, and a convex area 7e can preferably be disposed between the two concave areas 7c and 7d. Area 7c can preferably have a radius of curvature of about 9 mm. Area 7d can preferably have a radius of curvature of about 12 mm, and area 7e can have a radius of curvature of about 7 mm. There can also be transitional areas between areas 7c and 7e, and between areas 7e and 7d.

Retaining ring 7 can also preferably have two side portions 7f and 7g, which side portions 7f and 7g can be disposed opposite one another and generally transverse to the longitudinal axis 3a. Side portions 7f and 7g can both have a radius of curvature of about 2.75 mm. In addition, there can also be a transitional area between side 7f and area 7c, and between side 7g and area 7d.

Located radially inward of shell surface 7b is surface 7a. Surface 7a can preferably be disposed substantially parallel to longitudinal axis 3a, and there can be transitional areas between side 7f and surface 7a, and between side 7g and surface 7a.

As can best be seen in FIGS. 12 and 13, retaining ring 7 can preferably extend radially inward past external tube 5 about 1 mm. Further, retaining ring 7 can preferably have a width (taken from surface 7a to area 7e) of about 5 mm, and can also have a length (taken between sides 7f and 7g) of about 10 mm. Still further, the retaining ring 7 can have a diameter of about 60 mm.

Thus, in summary, retaining ring 7 can preferably have, in accordance with one preferred embodiment, concave areas 7c and 7d disposed circumferentially in shell surface 7b. Also disposed circumferentially on shell surface 7b is convex area 7e, located between areas 7c and 7d. Areas 7c and 7d can extend or taper into side portions 7f and 7g, respectively. Lastly, side portions 7f and 7g can extend or taper into surface 7a, thus forming rounded edges 7h and 7i. Rounded edges 7h and 7i of surface 7a can preferably have anti-friction properties along with surface 7a, at last when the external tube 5 is in an inclined position, which can enable surface 7a to slide along part 1a of rolling bellows 1, thereby providing a guiding function as discussed further above.

In accordance with an alternative embodiment of the present invention not shown here, the retaining ring 7 can preferably have a semi-circular shape. That is, instead of having the concave areas 7c and 7d as described above with reference to FIG. 14, the portion of the retaining ring 7 which faces away from tubular body 3 can preferably be continuously circular. Further, the retaining ring 7 can also have a flat portion similar to surface 7a. Thus, the cross-section of the retaining ring 7 in accordance with this embodiment would be a half-circle.

In accordance with yet an additional alternative embodiment not shown here, the retaining ring 7 can preferably have two essentially flat portions which preferably meet at a raised point, which raised point would correspond to area 7e discussed above. In accordance with this particular embodiment, the two flat portions can correspond to concave areas 7c and 7d discussed above, and, there can also be an additional essentially flat surface corresponding to surface 7a. Thus, this retaining ring 7 can generally have a triangular cross-section.

FIG. 15 shows one example of a complete shock absorber or vibration damper 100 which incorporates the pneumatic spring of the present invention. The shock absorber 100 can generally include the tubular body 3, the end of which tubular body 3 can preferably be equipped with a connecting mechanism 101 for attachment to a wheel mounting of a motor vehicle. The shock absorber 100 can also include an additional connecting mechanism 102 disposed a distance away from connecting mechanism 101, preferably for attachment to the body of the motor vehicle. Further, external tube 5 can preferably be disposed about the tubular body 3.

A piston rod 103 can preferably project into an inner cylinder 104 of the shock absorber 100, which inner cylinder 104 can preferably be disposed within tubular body 3. The piston rod 103 can preferably have the connection 102 for attaching the piston rod 103 to the body of the motor vehicle. A piston 105 equipped with a damping valve can be attached to one end of the piston rod 103. The piston rod 103, along with its piston 105, can preferably move axially within cylinder 104. The piston 105 divides the cylinder 104 into an upper working chamber 106 and a lower working chamber 107. The piston rod 103 can preferably be guided inside cylinder 104 by a piston rod guide 108.

The inside diameter of the tubular body 3 and the outside diameter of the cylinder 104 can preferably form an equalization chamber 109 for the cylinder 104, and the cylinder 104 can be connected to the equalization chamber via a base valve 110. The equalization chamber 109 can be connected to working chambers 106 and 107 by a passage 111 disposed between the bottom of the cylinder 104 and the inner portion of the bottom of tubular body 3.

The shock absorber 100 can also include the pneumatic spring of the present invention, which pneumatic spring can preferably be pressurized via a pressure connection 112. The pressure connection 112 can preferably be located along external tube 5.

One possible mode of operation of the pneumatic spring shown in FIG. 15 can preferably be as follows. The pneumatic spring can preferably be pressurized via pressure connection 112. Part 1a can then expand and cause movement of the external tube 5. The external tube 5 can preferably be connected to the piston rod 103 via an end piece 113. The substantially axial movement of the external tube 5 can preferably cause axial movement of the piston rod 103 to provide additional damping characteristics.

Figure 16:
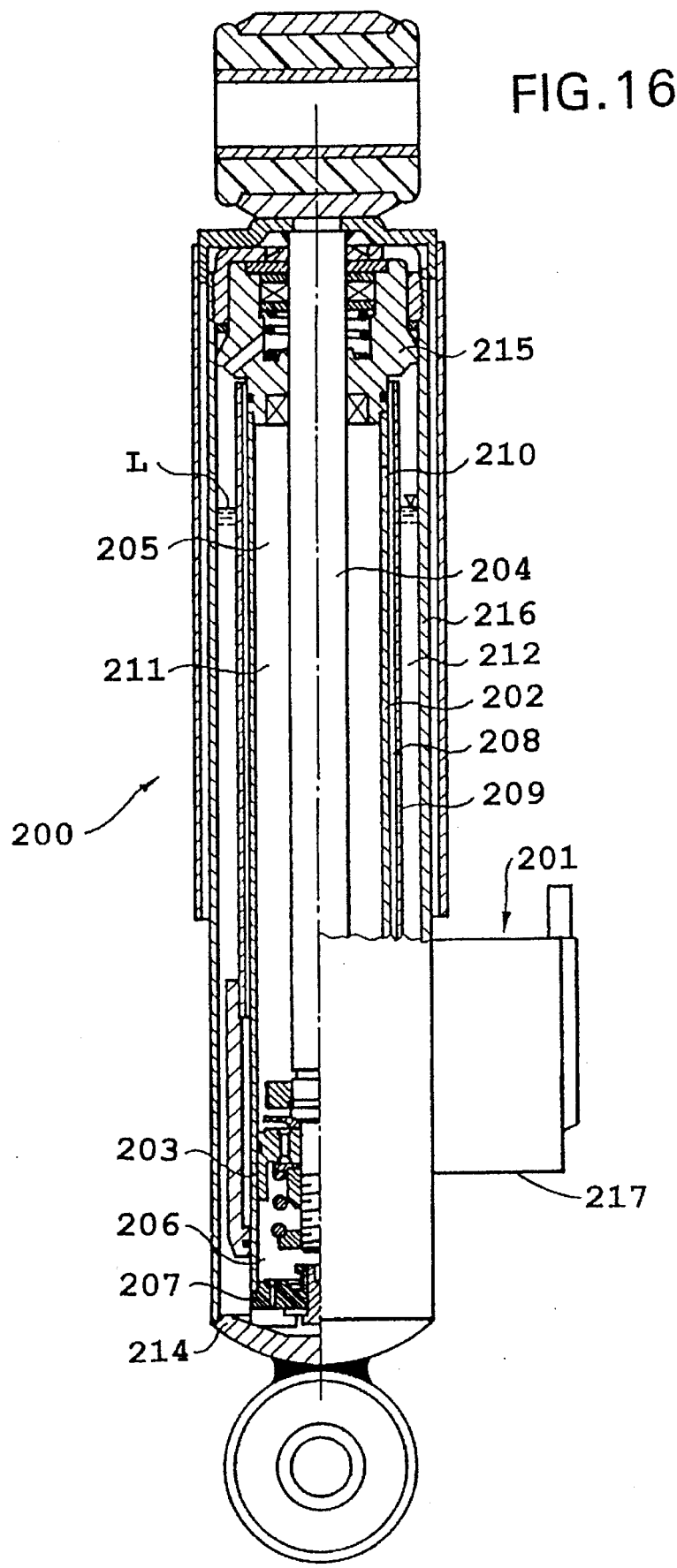
FIGS. 16 and 17 show an additional example of a shock absorber in which the present invention may be employed.
Figure 17:
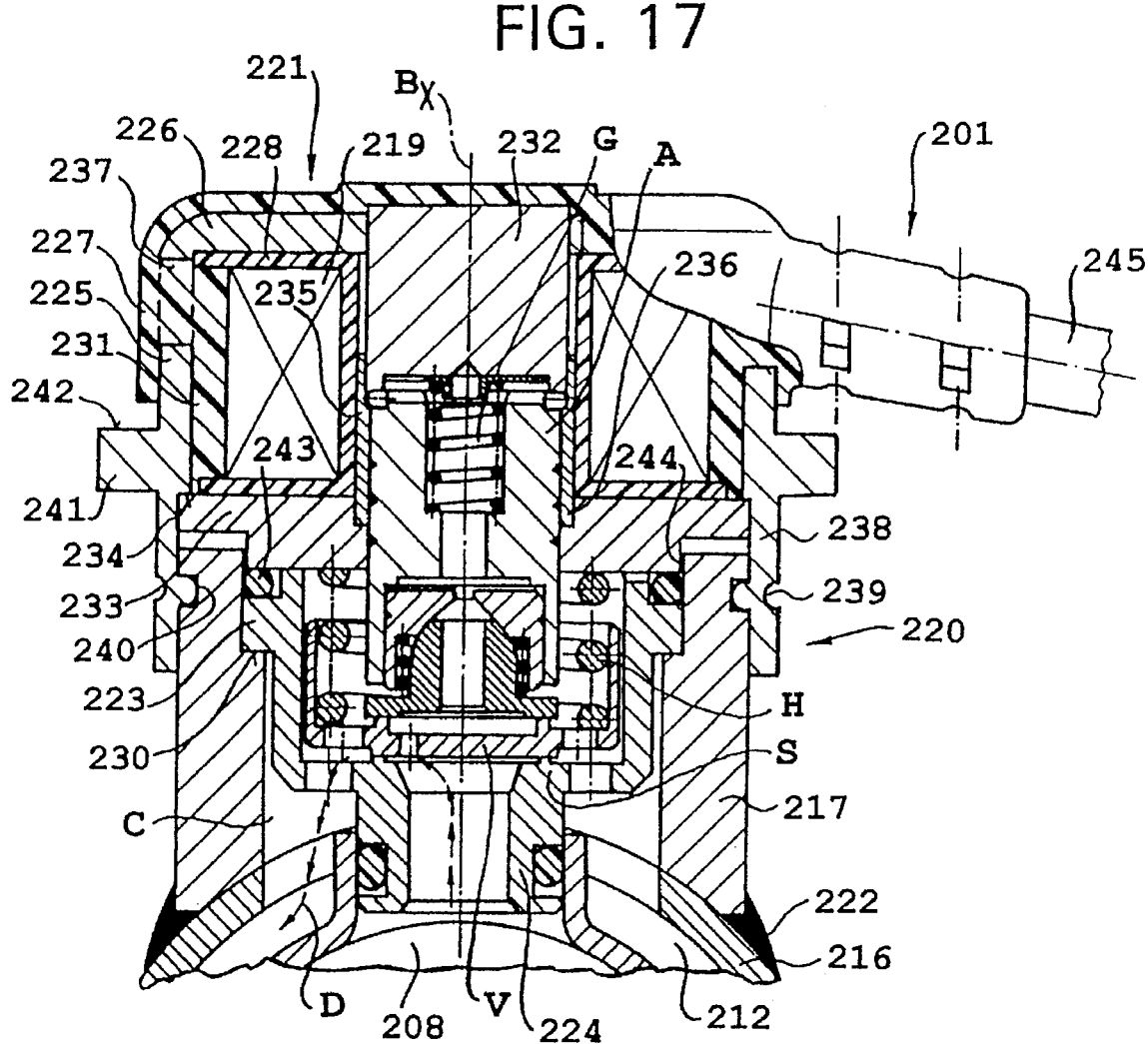

FIGS. 16 and 17 show an example of a typical shock absorber, vibration damper, or oscillation damper in which the present invention may conceivably be incorporated. It should be understood that the components found hereinbelow can be considered to be interchangeable with similar components discussed hereinabove.

FIG. 16 shows a complete shock absorber or oscillation damper 200, a detailed illustration of the valve unit 201 being omitted for the sake of clarity. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. Both the upper and the lower working chambers 211, 206 are preferably filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211. According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. This is shown in more detail in FIG. 4, which will be described later. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force can be reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. As such, the damping force can again be reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

In FIG. 17 one can again see the fluid path 208 and the compensating chamber 212, which are interconnectable through the valve unit 201. The fluid path 208 is connected to the upper working chamber 211 as shown in FIG. 16. The flow direction from the fluid path 208 to the compensating chamber 212 across the valve unit 201 is indicated in FIG. 17 by the dotted line D provided with arrows indicating the flow direction both for inward movement and outward movement of the piston rod 204 with respect to the pressure pipe 202. One can see in FIG. 17 a valve member V which can be lifted with respect to a valve seat S, such as to open the flow path D from the fluid path 208 to the compensating chamber 212.

For explaining the principles of the embodiment of the present invention shown in FIGS. 16 and 17, it is sufficient to say that the valve member V is urged downward in the closing sense towards the valve seat S by a helical compression spring H and that the valve member V can be lifted in response to upward movement of an electromagnetic armature member A. This armature member A is biased in downward direction by a helical compression spring G and can be lifted by energization of a magnetic coil 219 which is energized through a current supple cable 245.

The valve unit 201 comprises a housing 220. This housing 220 is composed by the side tube 217 and a cover unit 221. The side tube 217 is welded at 222 to the container tube 216. The cover unit 221 is fastened to the side tube 217.

A pot-shaped valve components housing 223 is inserted into the side tube 217 and is axially located on a shoulder face 230 inside the side tube 217. Various valve components are located inside the valve components housing 223. The lower end of the valve components housing 223 is shaped as a tube section 224, which provides the valve seat S and is sealingly connected to the fluid path 208.

The cover unit 221 comprises an iron jacket 225 integral with an iron end wall 226. The iron jacket 225 and the iron end wall 226 are coated with a plastic layer 227. The annular electromagnetic coil 219 is housed within the iron jacket 225. This electromagnetic coil 219 is carried by a coil carrier 228, which is annular about the axis $B_x$ and is open in a radially outward direction. The coil carrier 228 is closed in the radially outward direction by a plastics material 231 integral with the plastic layer 227 through openings 237 of the iron jacket 225. The plastics layer 227 and the plastics material 231 are integrally moulded by injection moulding with the iron jacket 225, the iron end wall 226 integral therewith, and the electromagnetic coil 219 and carrier 228 being inserted into the injection mould.

A ferromagnetic core 232 is inserted into a central opening of the iron end wall 226 and covered by the plastics layer 227. An iron flange portion 233 is provided at the lower side of the electromagnetic coil 219 and is engaged with a shoulder face 234 of the iron jacket 225. A pole tube 235 is seated within an annular recess 236 of the iron flange portion 233. The pole tube 235 is sealingly connected to the iron flange portion 233 and to the ferromagnetic core 232. The armature A is guided within the pole tube 235. The pole tube 235 is made of nonmagnetic material so that the magnetic field lines are deflected by the lower end of the pole tube 235. The iron jacket 225, the iron end wall 226, the ferromagnetic core 232 and the iron flange portion 233 form a ferromagnetic core arrangement which toroidally surrounds the electromagnetic coil 219.

The cover unit 221 is fastened to the side tube 217 by a sleeve-shaped extension 238 of the iron jacket 225. This sleeve-shaped extension 238 axially overlaps the side tube 217 by a circumferential bead 239 being embossed into a circumferential groove 240 on the radially outer face of the side tube 217. The iron jacket 225 is provided with a pretensioning flange 241. The pretensioning flange 241 offers a pretension face 242. The cover unit 221 can be pretensioned in downward direction as shown in FIG. 17 toward the container tube 216 by a pretensioning tool engaging the container tube 216, on the one hand, and the pretensioning face 242, on the other hand. As such, the iron flange portion 233 can be pressed against the upper end of the valve components housing 223, the valve components housing 223 is engaged with the shoulder face 230 of the side tube 217, and the iron flange portion 233 is engaged with the shoulder face 234 of the iron jacket 225. The helical compression spring H is compressed between the iron flange portion 233 and the valve member V, which is seated on the valve seat S.

While maintaining this pretension of the cover unit 221 against the side tube 217, the bead 239 is rolled or caulked into the circumferential groove 240 of the side tube 217 so that after removing the pretensioning tool an internal pretension is maintained. A sealing ring 243 is, therefore, maintained in sealing engagement with the valve components housing 223, the iron flange portion 233 and the side tube 217. As such, the compartment C confined by the side tube 217 and the cover unit 221 is sealed against atmosphere. All components of the valve unit 201 are positioned with respect to each other, and the helical compression spring M as well as the helical compression spring G and further springs are biased to the desired degree.

It is to be noted that the upper end of the side tube 217 is radially engaged at 244 with the iron flange portion 233 such that when rolling or caulking the bead 239 into the groove 240, no deformation of the side tube 217 and of the iron jacket 225 can occur.

The electromagnetic coil 219 is completely separated from the liquid within the compartment C by the iron flange portion 233. The pretension during connecting the cover unit 221 and the side tube 217 is selected such that no play can occur.

One feature of the invention resides broadly in the pneumatic spring, composed of a spring carrier against which a roller tube is braced, which roller tube together with a spring bellows and an outer tube forms a spring chamber, and an end cap braced against that end of the spring carrier facing the outer tube, characterized by the fact that the roller tube 7' and the end cap 27' are connected 31', 35' to form a structural unit, whereby the connection 31', 35' permits axial relative movement between the end cap 27' and the roller tube 7' at least for assembly.

Another feature of the invention resides broadly in the pneumatic spring characterized by the fact that the connection 31' is realized as a detachable temporary connection 31a', 31b', which separates after assembly.

Yet another feature of the invention resides broadly in the pneumatic spring characterized by the fact that the temporary connection 31b' consists of a press fit.

Still another feature of the invention resides broadly in the pneumatic spring characterized by the fact that the temporary connection 31a' is realized as a snap connection.

A further feature of the invention resides broadly in the pneumatic spring characterized by the fact that the temporary connection has an engineered breaking point between the roller tube 7' and the end cap 27'.

Another feature of the invention resides broadly in the pneumatic spring characterized by the fact that the connection formed by an elastic transfer element 31c'.

Yet another feature of the invention resides broadly in the process for the assembly of a pneumatic spring characterized by the fact that the roller tube 7' and the end cap 27' are connected by means of a temporary connection 31' to form a structural unit, whereby the end cap 27' is pushed onto the spring carrier 13' and axial assembly forces cause the roller tube 7' and the end cap 27' to undergo an axial relative movement until reaching the respective final installed positions.

Still another feature of the invention resides broadly in the pneumatic spring characterized by the fact that the transfer forces of the temporary connection 31', 35 are greater than the frictional forces acting on the end cap 27' when mounting it to the spring carrier 13'.

Another feature of the invention resides broadly in the pneumatic spring, comprising an elastic rolling bellows connected to a tubular body and together with an essentially rigid external tube forms a spring chamber, and a bellows fastening between the rolling bellows and the external tube, whereby the rolling bellows are inserted into the external tube in a fastening segment, and are held in place by means of a retaining ring, characterized by the fact that the retaining ring 7, by means of its inner surface 7a, can act as a guide with respect to the portion 1a of the rolling bellows connected to the tubular body 3, so that the external tube 5 is kept at a distance with respect to the part 1a of the rolling bellows.

Another feature of the invention resides broadly in the pneumatic spring characterized by the fact that the retaining ring 7 is made, at least on its inner surface 7a of an anti-friction material.

Yet another feature of the invention resides broadly in the pneumatic spring characterized by the fact that the retaining ring 7a has, over its entire axial length, at least one cross sectional change in the radial direction.

As discussed hereinabove, the entire retaining ring 7 and/or surface 7a of retaining ring 7, can preferably be made of an anti-friction material, such as, for example, plastic. Some specific types of plastic which could be used are polystyrenes, polyvinyl chlorides, teflon, polyethylenes, polypropylenes, and polyesters.

Alternatively, the retaining ring 7 can, in accordance with one embodiment of the present invention, be made of a metal, which metal can then be coated to provide anti-frictional properties on surface 7a. The metal retaining ring 7 can be coated with, for example, one of the plastics listed immediately above. Further examples of coatings which could be used to coat the metal retaining ring 7 may be disclosed in the following U.S. Patents: No. 5,179,174 to Elton et al. on Jan. 12, 1993, entitled "Flexible Lubricious Organic Coatings", No. 4,647,389 to Karol et al. on Mar. 3, 1987, entitled "Anti-friction Additives for Lubricating Oils"; No, 4,650,034 to D'Avanzo on Jan. 6, 1986, entitled "Saftey Escape Chute"; No. 4,758,361 to Karol on Jul. 19, 1988, entitled "Lubricating Oil of Improved Anti-friction Properties . . . "; and No. 5,173,532 to Endo et al. on Mar. 10, 1992, entitled "Anti-friction and Wear Resistant Polyacetal Molding Compositions".

Examples of pneumatic springs, alternatively termed as "air springs" or "air shocks", and components thereof, which may be utilized in accordance with the embodiments of the present invention, may be found in the following U.S. Patents: No. 5,180,144, which issued to Hellyer et al. on Jan. 19, 1993; No. 5,009,401, which issued to Weitzenhof on Apr. 23, 1991; No. 4,988,082, which issued to Pees on Jan. 29, 1991; No. 4,332,397, which issued to Steger on Jun. 1, 1982; No. 4,166,522, which issued to Bourcier on Sep. 4, 1979; and No. 4,555,096, which issued to Pryor on Nov. 26, 1985.

Examples of shock absorbers, which may be utilized in accordance with the embodiments of the present invention may be found in the following U.S. Patents: No. 4,838,393, entitled "Hydro-mechanical Stop having a Restrictive Passage", which issued to Mourray et el. on Jun. 13, 1989; No. 4,817,928, entitled "Suspension System", which issued to Paton on Apr. 4, 1989; No. 4,527,674, entitled "Shock Absorber with a Hydro-mechanical Stop", which issued to Mourray on Jul. 9, 1985; No. 4,962,916, entitled "Compression Spring", which issued to Palinkas on Oct. 16, 1990; and No. 4,756,516, entitled "Resiliently Deformable Element Usable as an End Stop in a Motor Vehicle Suspension", which issued to Tondato on Jul. 12, 1988.

Examples of suspension systems, which may be utilized in accordance with the embodiments of the present invention may be found in the following U.S. Patents: No. 5,286,059, entitled "Height Control System When Vehicle is Jacked Up," which issued to Tabe; No. 5,180,024, entitled "Vehicle Height Control Apparatus," which issued to Eto; No. 5,324,056, entitled "High Performance Automobile Suspension," which issued to Orton.

Examples of caps or end caps retained in some manner which may be utilized with the present invention include: U.S. Pat. No. 5,243,823, entitled "Master Cylinder with Non-Threaded End Cap Retention;" U.S. Pat. No. 4,867,043, entitled "End Cap for Fluid Cylinder;" and U.S. Pat. No. 4,988,147, entitled "Hydraulic High-Pressure Pump for a Vehicle Brake System."

All of the patents, patent applications and publications recited herein, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A pneumatic spring and shock absorber assembly for a motor vehicle, said assembly comprising:

a shock absorber having a longitudinal axis and defining an axial direction parallel to said longitudinal axis, said shock absorber comprising:
- a sealed cylinder defining a chamber therein, said cylinder containing a damping medium;
- said cylinder having a first end portion and a second end portion and a length disposed substantially parallel to said longitudinal axis;
- a piston rod sealingly projecting into said first end portion of said cylinder and being axially displaceable with respect to said cylinder substantially along said longitudinal axis of said shock absorber;
- a piston attached to said piston rod, said piston being slidably disposed within said cylinder to sealingly divide said chamber into first and second chambers;
- means for permitting flow of damping medium between said first chamber and said second chamber;

a pneumatic spring for applying a substantially axially directed force to said shock absorber;

said pneumatic spring and shock absorber assembly comprising:
- a roll-off tube surrounding at least a portion of said cylinder, said roll-off tube having a length disposed substantially parallel to said longitudinal axis;
- bellow means configured for expanding and contracting to provide said substantially axially directed force;
- said bellow means being disposed to roll-up on, and roll off of, said roll-off tube;

said shock absorber and pneumatic spring assembly further comprising:
- said first end portion of said cylinder being disposed a substantial distance from said second end portion of said cylinder;
- a cap being disposed on said first end portion of said cylinder;
- at least one of said cap and said roll-off tube comprising means for connecting said roll-off tube and said cap during assembly of said pneumatic spring and shock absorber assembly;
- said cap comprising a cap body;
- said roll-off tube comprising a roll-off tube body;
- said cap and said roll-off tube comprising a cap and roll-off tube unit prior to assembly of said pneumatic spring and shock absorber assembly; and
- said cap body and said roll-off tube body being disposed a substantial distance from one another subsequent to assembly of said pneumatic spring and shock absorber assembly.

2. The pneumatic spring as claimed in claim 1, wherein said means for connecting comprises a detachable temporary connection, which separates after assembly.

3. The pneumatic spring as claimed in claim 1, wherein said temporary connection comprises a press fit between said cap body and said roll-off tube body.

4. The pneumatic spring as claimed in claim 2, wherein said temporary connection comprises a snap connection.

5. The pneumatic spring as claimed in claim 2, wherein said snap connection comprises a projection;
    said projection projecting from one of:
        said cap body and said roll-off tube body.

6. The pneumatic spring as claimed in claim 2, including at least one connection between said roller tube body and said end cap body, wherein said temporary connection comprises means for breaking at least one connection between said roller tube body and said end cap body.

7. The pneumatic spring as claimed in claim 2, wherein said breaking means comprises a portion of said roll-off tube and said end cap unit;
    said end cap body having an outer periphery;
    said unit narrows and is indented adjacent at least a portion of the outer periphery of said cap body.

8. The pneumatic spring as claimed in claim 2, wherein the connection means comprises at least one elastically deformable connecting element connecting said cap body and said roll-off tube body.

9. The pneumatic spring as claimed in claim 2, wherein the at least one elastically deformable connecting element comprises a stretchable material that will stretch during assembly of said roll-off tube body and said cap body unit and during separation of said roll-off tube body and said end cap body during assembly of said shock absorber and pneumatic spring assembly;
    said stretchable material maintaining a stiffness sufficient to hold said roll-off tube body and said cap body together as a unit prior to assembly of said shock absorber and pneumatic spring assembly.

10. A pneumatic spring for being attached to a shock absorber in a motor vehicle, said pneumatic spring comprising:
- a roll-off tube surrounding at least a portion of a cylinder of the shock absorber;
- bellow means configured for expanding and contracting to provide a substantially axially directed force along a shock absorber subsequent to assembly of said pneumatic spring and the shock absorber;
- said bellow means being disposed to roll-up on, and roll off of, said roll-off tube;
- a cap for being disposed at one end of the shock absorber;
- means for connecting said cap and said roll-off tube as a unit prior to assembly;
- means for releasing said means for connecting said cap from said roll-off tube during assembly and maintaining the release subsequent to assembly;
- said cap comprising a cap body;
- said roll-off tube comprising a roll-off tube body;
- said cap and said roll-off tube comprising a cap and roll-off tube unit prior to assembly of said pneumatic spring and shock absorber assembly;
- said cap body and said roll-off tube body being disposed a substantial distance from one another subsequent to assembly of said pneumatic spring and shock absorber assembly.

11. The pneumatic spring as claimed in claim 10, wherein said means for connecting comprises a detachable temporary connection, which separates after assembly.

12. The pneumatic spring as claimed in claim 11, wherein said temporary connection comprises a press fit between said cap body and said roll-off tube body.

13. The pneumatic spring as claimed in claim 11, wherein said temporary connection comprises a snap connection.

14. The pneumatic spring as claimed in claim 11, wherein said snap connection comprises a projection;
    said projection projecting from one of:
        said cap body and said roll-off tube body.

15. The pneumatic spring as claimed in claim 11, including at least one connection between said roller tube body and said end cap body, wherein said temporary connection comprises means for breaking at least one connection between said roller tube body and said end cap body.

16. The pneumatic spring as claimed in claim 11, wherein said breaking means comprises a portion of said roll-off tube and said end cap unit;

said end cap body having an outer periphery;

said unit narrows and is indented adjacent at least a portion of the outer periphery of said cap body.

17. The pneumatic spring as claimed in claim 10, wherein the connection means comprises at least one elastically deformable connecting element connecting said cap body and said roll-off tube body.

18. The pneumatic spring as claimed in claim 10, wherein the at least one elastically deformable connecting element comprises a stretchable material that will stretch during assembly of said roll-off tube body and said cap body unit and during separation of said roll-off tube body and said end cap body during assembly of said shock absorber and pneumatic spring assembly;

said stretchable material maintaining a stiffness sufficient to hold said roll-off tube body and said cap body together as a unit prior to assembly of said shock absorber and pneumatic spring assembly.

19. A method of assembling a pneumatic spring and shock absorber assembly for a motor vehicle, said assembly comprising: a shock absorber having a longitudinal axis and defining an axial direction parallel to said longitudinal axis, said shock absorber comprising: a sealed cylinder defining a chamber therein, said cylinder containing a damping medium; said cylinder having a first end portion and a second end portion and a length disposed substantially parallel to said longitudinal axis; a piston rod sealingly projecting into said first end portion of said cylinder and being axially displaceable with respect to said cylinder substantially along said longitudinal axis of said shock absorber; a piston attached to said piston rod, said piston being slidably disposed within said cylinder to sealingly divide said chamber into first and second chambers; means for permitting flow of damping medium between said first chamber and said second chamber; a pneumatic spring for applying a substantially axially directed force to said shock absorber; said pneumatic spring and shock absorber assembly comprising: a roll-off tube surrounding at least a portion of said cylinder, said roll-off tube having a length disposed substantially parallel to said longitudinal axis; bellow means configured for expanding and contracting to provide said substantially axially directed force; said bellow means being disposed to roll-up on, and roll off of, said roll-off tube; said shock absorber and pneumatic spring assembly further comprising: said first end portion of said cylinder being disposed a substantial distance from said second end portion of said cylinder; a cap being disposed on said first end portion of said cylinder; at least one of said cap and said roll-off tube comprising means for connecting said roll-off tube and said cap during assembly of said pneumatic spring and shock absorber assembly; said cap comprising a cap body; said roll-off tube comprising a roll-off tube body; said cap and said roll-off tube comprising a cap and roll-off tube unit prior to assembly of said pneumatic spring and shock absorber assembly; said cap body and said roll-off tube body being disposed a substantial distance from one another subsequent to assembly of said pneumatic spring and shock absorber assembly, said method comprising the steps of:

providing said shock absorber, said shock absorber having a longitudinal axis and defining an axial direction parallel to said longitudinal axis;

said step of providing said shock absorber comprises:
  providing said sealed cylinder, said cylinder defining a chamber therein, said cylinder containing a damping medium;
  providing said cylinder, said cylinder having a first end portion and a second end portion and a length disposed substantially parallel to said longitudinal axis;
  providing said piston rod;
  providing said piston;
  providing said means for permitting flow of damping medium between said first chamber and said second chamber;
  providing said pneumatic spring for applying a substantially axially directed force to said shock absorber;

said step of providing said pneumatic spring and shock absorber assembly comprises:
  providing said roll-off tube, said roll-off tube surrounding at least a portion of said cylinder, said roll-off tube having a length disposed substantially parallel to said longitudinal axis;
  providing said bellow means configured for expanding and contracting to provide said substantially axially directed force;
  providing said cap;
  providing said roll-off tube;

said step of providing said shock absorber and pneumatic spring assembly further comprises:
  filling at least a portion of said cylinder with damping medium;
  attaching said piston to said piston rod;
  inserting said piston rod and said piston into said first end portion of said cylinder such that said piston rod is axially displaceable with respect to said cylinder substantially along said longitudinal axis, and such that said piston is slidably disposed within said cylinder to sealingly divide said chamber into said first and second chambers;
  disposing said roll-off tube and end cap unit to surround at least a portion of said cylinder;
  pushing said roll-off tube and end cap unit along said cylinder;
  seating said end cap body against the end of said cylinder;
  separating said end cap body and said roll-off tube body from one another; and
  continuing to push said roll-off tube body along said cylinder to provide a distance between said roll-off tube body and said end cap body.

* * * * *

UNITED STATES PATENT AND TRADEMARK OFFICE
CERTIFICATE OF CORRECTION

PATENT NO. : 5,636,831
DATED : June 10, 1997
INVENTOR(S) : Holger GUBITZ

It is certified that error appears in the above-identified patent and that said Letters Patent is hereby corrected as shown below:

On the title page, item [56], under the U.S. PATENT DOCUMENTS section, before '8/1983', delete "4,398,706" and insert --4,398,704--.

In column 6, line 54, after 'at', delete "last" and insert --least--.

In column 10, line 53, after 'spring', delete "M" and insert --H--.

In column 12, line 32, after 'et', delete "el." and insert --al.--.

Signed and Sealed this

Twenty-eighth Day of April, 1998

Attest:

BRUCE LEHMAN

*Attesting Officer*     *Commissioner of Patents and Trademarks*